United States Patent
Bapt et al.

[11] Patent Number: 6,035,913
[45] Date of Patent: Mar. 14, 2000

[54] WHEEL WITH RIM HAVING SEATS INCLINED TOWARDS THE OUTSIDE

[75] Inventors: Jean-Louis Bapt, La-Roche-Blanche; Olivier Muhlhoff, Clermont-Ferrand, both of France

[73] Assignee: Compagnie Générale des Etablissements Michelin - Michelin & CIE, Clermont-Ferrand Cedex, France

[21] Appl. No.: 08/853,092

[22] Filed: May 8, 1997

[30] Foreign Application Priority Data

May 15, 1996 [FR] France ................................. 96 06254

[51] Int. Cl.[7] .................................................. B60B 21/02
[52] U.S. Cl. .................................. 152/381.4; 152/379.5; 152/381.4; 152/384; 152/380; 301/98
[58] Field of Search ............................ 152/379.3, 379.4, 152/379.5, 381.4, 384, 393, 394, 380, 516; 301/95, 96, 97, 98

[56] References Cited

U.S. PATENT DOCUMENTS

| | | | |
|---|---|---|---|
| 512,917 | 1/1894 | Stead | 152/384 |
| 727,582 | 5/1903 | Brintnell | 152/379.3 |
| 1,070,044 | 8/1913 | Lappe | 152/384 |
| 1,109,066 | 9/1914 | Hemington | 152/394 |
| 1,165,845 | 12/1915 | Cairns | 152/393 |
| 1,396,515 | 11/1921 | McClevey | 152/384 |
| 1,814,623 | 7/1931 | Finnell | 152/393 |
| 3,977,727 | 8/1976 | Glasenapp | |
| 4,351,382 | 9/1982 | Corner et al. | 152/379.4 |
| 4,502,521 | 3/1985 | Tavazza et al. | |
| 4,561,482 | 12/1985 | Tavazza et al. | |
| 4,572,265 | 2/1986 | Lescoffit | |
| 4,606,390 | 8/1986 | Shute | 152/379.3 |
| 4,693,104 | 9/1987 | Mori | 72/68 |
| 4,798,418 | 1/1989 | Kempf et al. | 152/379.3 |
| 5,568,830 | 10/1996 | Polsinelli et al. | 152/379.5 |
| 5,634,993 | 6/1997 | Drieux et al. | 152/379.3 |
| 5,785,781 | 7/1998 | Drieux et al. | 152/381.4 |
| 5,787,950 | 8/1998 | Muhlhoff et al. | 152/379.5 |

FOREIGN PATENT DOCUMENTS

| | | | |
|---|---|---|---|
| 990815 | 5/1949 | France | 152/393 |
| 1094168 | 3/1954 | France | 152/379.3 |
| 2699121 | 6/1994 | France . | |
| 3236610 | 4/1984 | Germany . | |
| 4422726 | 1/1996 | Germany . | |
| 8914 | 1/1980 | Japan | 301/97 |
| 125851 | 5/1928 | Switzerland | 301/95 |
| 2064446 | 6/1981 | United Kingdom | 152/381.4 |
| 1601497 | 10/1981 | United Kingdom | 301/97 |

*Primary Examiner*—S. Joseph Morano
*Assistant Examiner*—Long Bao Nguyen
*Attorney, Agent, or Firm*—Baker Botts L.L.P.

[57] ABSTRACT

A wheel is formed of a rim and a wheel disk, the rim having a first rim seat and a second rim seat, at least the first rim seat having a generatrix which is inclined towards the outside and extended axially towards the inside by a bearing surface intended to receive a tread support ring. The rim bearing surface is provided, radially to the outside, with elements in relief separated by recesses or hollows. On the major part of the entire surface of the radially inner wall of the wheel rim, each point of a generatrix of the radially inner wall, included between the point of tangency A of said generatrix with the corresponding axially inner generatrix of the disk and the end B axially located on the end of the second wheel seat, is on a circle of diameter $D_P$ which is at least equal to the diameter $D_A$ of the circle on which the point of tangency A is located and at most equal to the diameter $D_B$ of the circle on which the end B is located.

16 Claims, 4 Drawing Sheets

WHEEL WITH RIM HAVING SEATS INCLINED TOWARDS THE OUTSIDE

BACKGROUND OF THE INVENTION

The present invention relates to a wheel which is formed of a wheel disk and of a monobloc mounting rim for a tire, preferably a tire which has a radial carcass reinforcement and is capable of possibly forming, with a tread supporting ring in said tire, a rolling assembly which may be useful in the event of travel when the inflation pressure drops abnormally as compared with the normal pressure of use, known as the nominal service pressure, which pressure may even be zero.

The main difficulties encountered in the case of traveling on a flat tire or a tire with low pressure concern the risk of separation of the bead of the tire and, in particular, separation of the bead located on the outer side of the tire mounted on the outer side of the vehicle. The well-known techniques proposed for avoiding such separations, and in particular the one consisting of arranging a protrusion or hump of small height axially to the interior of the rim outer seat, do not appear to give full satisfaction and tend to increase the difficulties in the mounting and dismounting of the tires.

French Application No. 2 699 121 describes, by way of example, a monobloc wheel rim 1 shown in FIG. 1 for the effective solution of the above problem. Said rim 1 is limited axially by two rim edges spaced axially apart by the width S of the rim. Said rim 1 comprises, as viewed in meridian section:

- a first rim seat 13' having a generatrix the axially outer end of which is on a circle of a diameter less than the diameter of the circle on which the axially inner end is located (the seat is then said to be inclined towards the outside) and limited axially to the outside by a protrusion or hump 15' of slight height;
- a second rim seat 13" having a generatrix the axially inner end of which is, on the one hand, on a circle of a diameter at least equal to the diameter of the circle on which the axially inner end of the generatrix of the first rim seat is located (and in the case shown in FIG. 1 of said application, on a circle of a diameter equal to that on which the axially inner end is located) and, on the other hand, on a circle of a diameter greater than the diameter of the circle on which its axially outer end is located, said second generatrix being extended axially to the outside by a hump 15" and axially to the inside by a rim flange 14.

In accordance with the respective differences in diameter of the circles on which the axially inner ends of the two rim seats are located, said rim may or may not be provided with a mounting groove 12, preferably located axially close to the second rim seat 13".

Said rim 1 is intended to be used advantageously with a tread support (not shown), a resilient support which can be removed and placed on a rim bearing surface 11, the generatrix of which may be linear or not and, if linear, parallel or not to the axis of rotation, a positioning stop 16 located between said bearing surface 11 and the mounting groove 12 permitting the axial positioning of the support in collaboration with one of the beads of the tire.

The depth of the mounting groove as well as the operating constraints which are not to be exceeded make necessary, in case the wheel is made of steel and the desired radially outer profile being given, axially variable thicknesses of metal and thus a radially inner meridian profile such as that shown in FIG. 1. It follows from an examination of said figure, and this in practically all possible mountings of tires on rims of this type, that the space radially available below the mounting groove 12 is greatly reduced as compared with the space radially below the bearing surface 11.

The fact that the mounting groove is situated axially closer to one edge of the rim than to the middle of the surface entails the risk of leading to the accumulation, below the corresponding portion of the bearing surface, of all sorts of materials, such as mud mixed to a greater or lesser extent with particles, such as snow or ice under winter conditions, which materials are difficult to remove. Furthermore, the constant desire for less weight of the rim leads to the use of a material of low density for its manufacture. This use permits production in the form of a wheel, rim 1 and disk being then molded together at the same time but, on the other hand, results in serious modifications of the radially inner and outer meridian profiles, respectively, so as to correctly stabilize said wheel, in view of the severe conditions imposed by travel under zero or low pressure.

SUMMARY OF THE INVENTION

In order to make it possible to obtain optimal lightness and remedy the above drawbacks, the wheel in accordance with the invention is formed of a rim having a first rim seat and a second rim seat, at least the first rim seat having a generatrix the axially outer end of which is located on a circle of a diameter less than the diameter of the circle on which the axially inner end is located, said first rim seat being extended axially to the outside by a protrusion or hump of small height and axially to the inside by a bearing surface intended to receive a tread support ring, and of a wheel disk connected on the side of the first rim seat to the radially inner wall of the rim. The rim surface is provided, radially to the outside, with elements in relief which are separated by recesses or hollows.

On the major portion of the entire surface of the radially inner wall of the wheel rim, each point of a generatrix of said wall contained between the point of tangency of said generatrix with the corresponding axially inner generatrix of the disk and the end located axially on the side of the second rim seat is on a circle of diameter $D_p$, at least equal to the diameter $D_A$ of the circle on which the said point of tangency is located and at most equal to the diameter $D_B$ of the circle on which said end is located.

Preferably, the major part of the entire surface of the radially inner wall represents all of said surface. Nevertheless, said part may be less, but it must, however, be equal to at least 70% of the total surface of the wall in order not to impede the removal of the materials which have accumulated within the rim.

The wheel is advantageously made of material(s) of low density, such as the metals aluminum and magnesium and all the alloys derived from these metals, or such as thermoplastic or thermosetting materials, whether or not filled.

By hump of small height there is to be understood a hump the height of which is preferably at most equal to 2.5% of the nominal diameter of the mounting rim, which is the diameter of the circle on which the axially inner end of the first rim seat is located.

If one calls the recessed ratio of the rim bearing surface, which is preferably cylindrical, the ratio of the surface occupied by the recesses or hollows to the total surface of the radially outer face of the bearing surface, said recessed ratio is preferably between 0.4 and 0.9.

The elements in relief may, on the one hand, be at least two circumferential ribs forming the axial edges of the bearing surface and, on the other hand, blocks of material. The elements in relief can also, in addition to the above circumferential ribs, be transverse or quasi-transverse ribs attached to the circumferential ribs and defining between them hollows which may be of various shapes and sizes. The transverse ribs, continuous or discontinuous, may in particular have, on the radially outer face of the bearing surface, surfaces of different shape, defined by transverse sides of different configurations—linear, curved, broken line, parallel or not, etc. For simplicity in the manufacture of the wheel, the said sides will preferably be linear so as to confer upon the recesses a quadrilateral shape which may be rectangular, square, trapezoidal, lozenge-shaped or the like. The linear sides will preferably be oriented by an angle at least equal to 45° with respect to the circumferential direction, whatever the geometrical shape of the hollows. Likewise, whether the two transverse linear sides of a transverse rib are parallel or not, it is advantageous for the width of a rib, measured perpendicular to the transverse center line of the surface of the rib, to be at least equal to 3 mm and at most equal to 7 mm.

As described in French Application 2 699 121, the rim in accordance with the invention preferably has a mounting groove located towards the second rim seat. One of the hollows, more precisely the hollow into which the passage orifice for the inflation valve extends, is preferably connected with the mounting groove by a channel, thus permitting the free passage of the inflation gas and the easier dismounting of the assembly consisting of the tire and the wheel support ring.

In the case of transverse ribs, the ribs may advantageously be discontinuous, one or more hollows separating the rib branches or the said ribs being each pierced by one or more holes; both variants permitting an equality of pressure in all the hollows of the bearing surface.

The cavities or hollows delimited by the circumferential ribs and the transverse ribs advantageously are of unequal volume. In particular, the transverse or quasi-transverse ribs can be arranged circumferentially in accordance with variable pitches. The same is true of the blocks which are not equidistant from each other.

As to the radially inner face of the rim, it is preferably uniform, but it may also, for example, have transverse ribs and grooves. The greatest part of said face will preferably be uniform, the balance being formed of at least one transverse rib the generatrix of which radially furthest to the inside possibly having points located on circles of diameters greater than the diameter of the circle on which the point of tangency of the generatrix with the generatrix of the disk is located. If there are several transverse ribs having bases anchored in the radially inner face of the rim, the bases should occupy an area at most equal to 30% of the total surface of the radially inner wall, and said ribs are circumferentially uniformly spaced apart and used as reinforcement ribs in order to avoid defects produced by possible concentration of stress produced by the shapes of certain rims.

The invention will be better understood from the drawings and accompanying the description which follows, illustrating non-limitative embodiments of a wheel intended for the mounting of a 185/60-14 tire.

DESCRIPTION OF PREFERRED EMBODIMENTS

Figure 1:
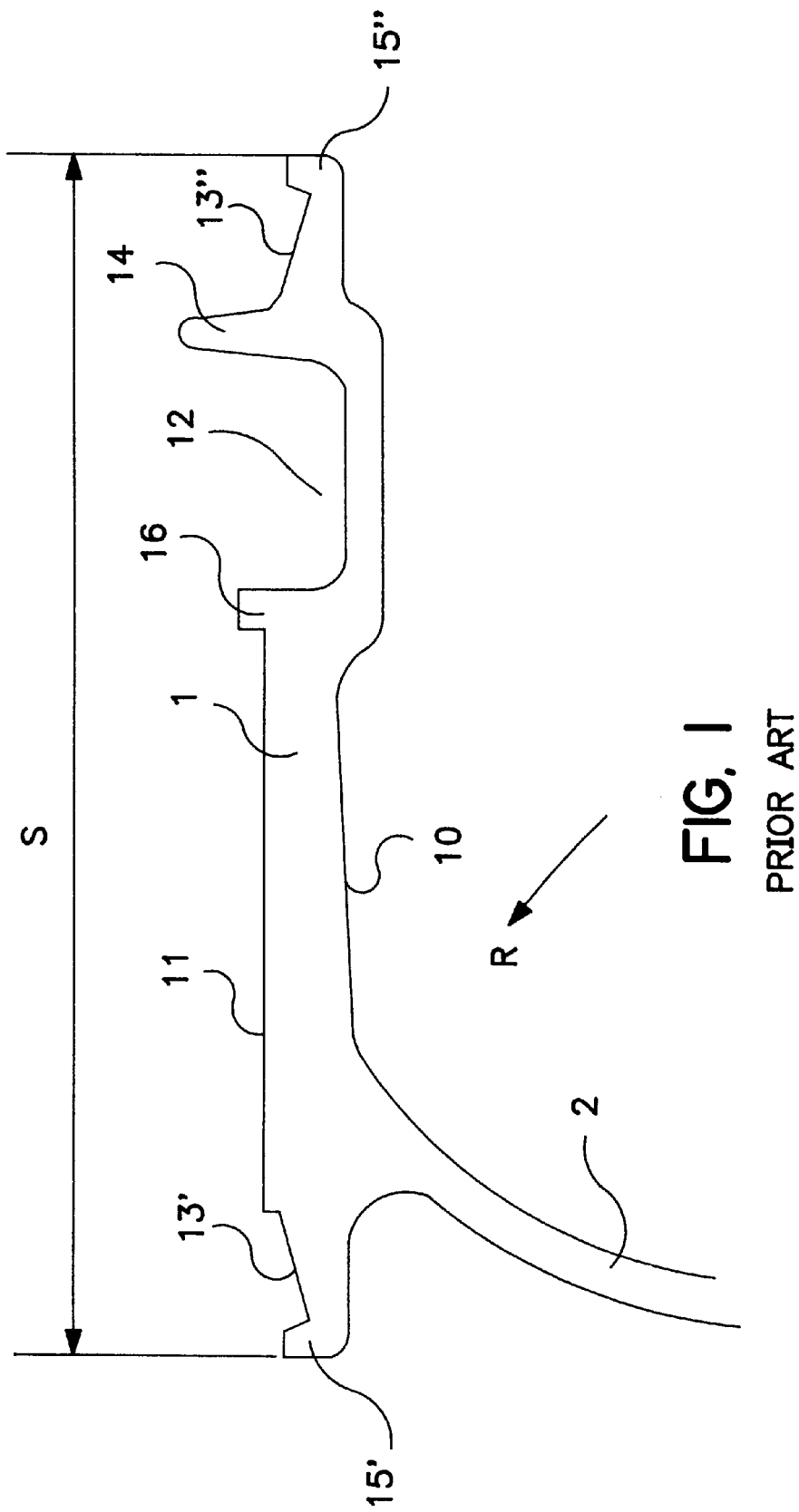
FIG. 1 is a diagrammatic meridian view of a wheel, such as described in said French application.
Figure 2:
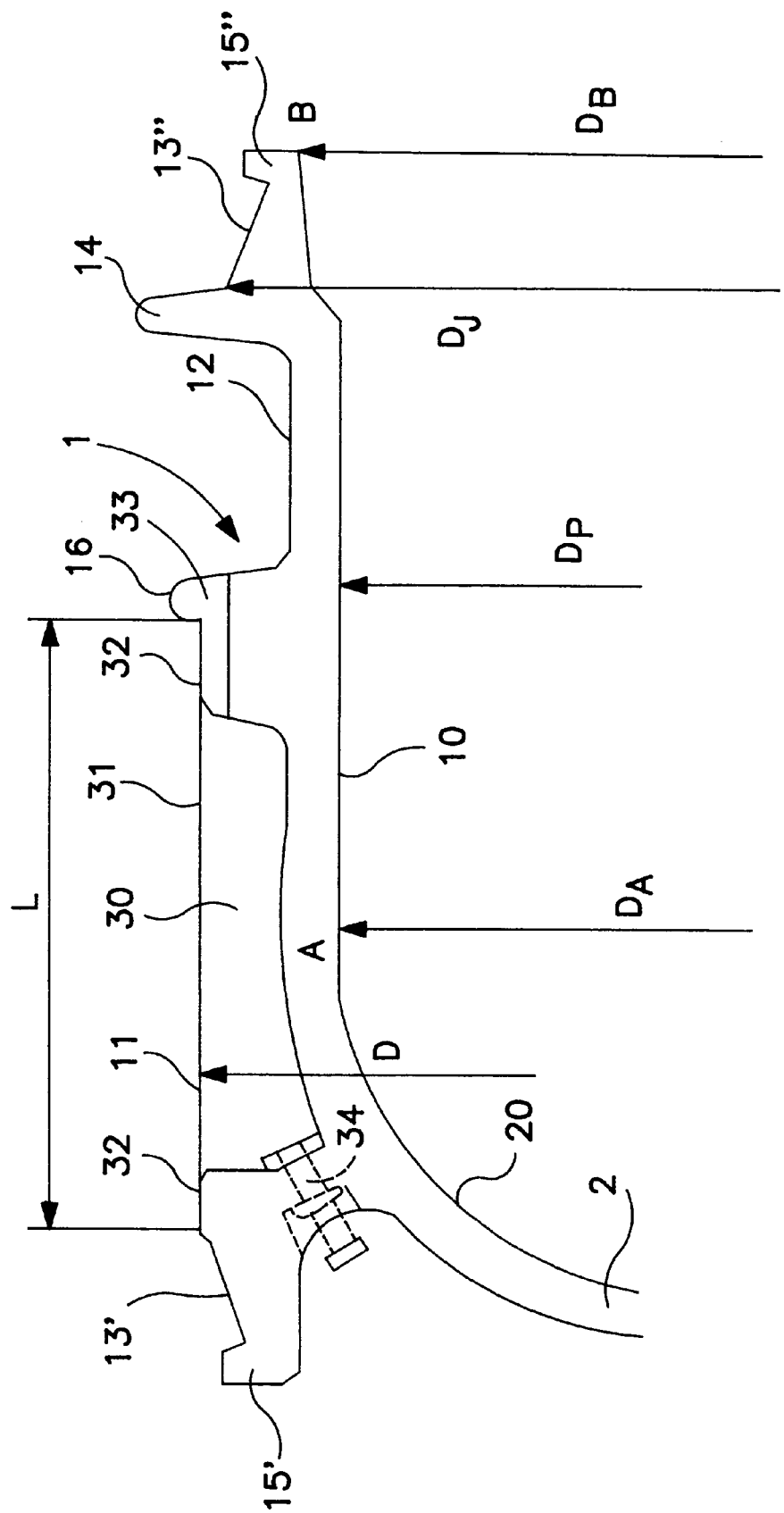
FIG. 2 is a diagrammatic meridian view of a wheel in accordance with the invention.

The wheel rim 1 shown in FIG. 2 has, to a large part, the characteristics of the rim 1 shown in FIG. 1, that is to say a rim with two rim seats 13' and 13" of equal diameter, the generatrices of which are inclined towards the outside, said rim seats being extended axially to the outside by humps 15' and 15" of a height of 6 mm, which represents about 0.017 times the nominal diameter $D_j$ of the rim 1, which is the common diameter of the axially inner ends of the two rim seats 13' and 13". The first rim seat 13' is extended axially towards the inside by a bearing surface 11, itself provided at its other end with a positioning stop 16 for the support ring intended to be mounted on said bearing surface 11. The second rim seat 13" is extended axially towards the inside by a rim flange 14 which, together with the positioning stop 16, defines a mounting groove 12.

In accordance with the invention, the bearing surface 11 is provided with recesses 30 of triangular shape (FIG. 3), said recesses being defined axially by circumferential ribs 32 of the bearing surface 11 and circumferentially by the transverse ribs 31, having, on the radially outer face of the bearing surface 11, linear sides 310 which are parallel to each other and which form an angle α of 45° with the circumferential direction. If we call $S_E$ the surface occupied by the recesses and $S_T$ the total cylindrical surface of the bearing surface 11, $S_T$ being equal to πDL, D and L being the diameter and axial width respectively of said radially outer face of the bearing surface 11, then the recessed ratio, defined as the ratio $S_E/S_T$, is equal to 0.6. The width 1, common in the example described to all the transverse ribs 31 and measured perpendicular to the common direction of the two sides 310 of the surface occupied by a rib 31, is between 3 mm and 7 mm. All the edges defining the elements in relief on the radially upper face of the bearing surface are advantageously beveled so as to facilitate the mounting of the support ring for the tread of the tire intended to be mounted on the rim.

As shown in FIG. 2, the valve passage 34 extends into one of the recesses 30 of the bearing surface 11, said recess being connected to the mounting groove 12 by a channel 33 of small dimensions permitting the passage of the inflation gas. This connection 33 between recess 30 and groove 12 facilitates the removal of the mounted assembly; in fact, without said connection, the vacuum produced by the deflation creates a close contact between the support ring and the ribs defining the recesses, resulting in difficulties in dismounting the rim and the assembly.

As to the generatrix 10 of the radially inner wall of the rim 1, it is tangent at A to the axially and radially inner wall of the wheel disk 2. In accordance with the invention, each point of said generatrix 10, like each point of every generatrix of said wall, integrally uniform in the case shown, located between the point A of tangency and its end B on the side of the second rim seat 13", is on a circle of diameter $D_p$ at least equal to the diameter $D_A$ of the circle on which the point of tangency A is located and at most equal to the diameter $D_B$ of the circle on which the end B is located, the passage from the diameter $D_A$ to the diameter $D_B$, greater than $D_A$ of the circle on which there is located the point B, taking place continuously over the greater part of the axial distance between the point of tangency A and the end B, as shown in FIG. 2. This avoids the mass buildup of foreign substances on the wheel and makes the removal of said bodies towards the outside possible. The complete removal of such material is all the easier due to the fact that the diameter of the radially inner wall 10 increases continuously, proceeding axially from the circle on which the point A is located to the circle comprising the point B, as shown in FIG. 5.

Figure 3:
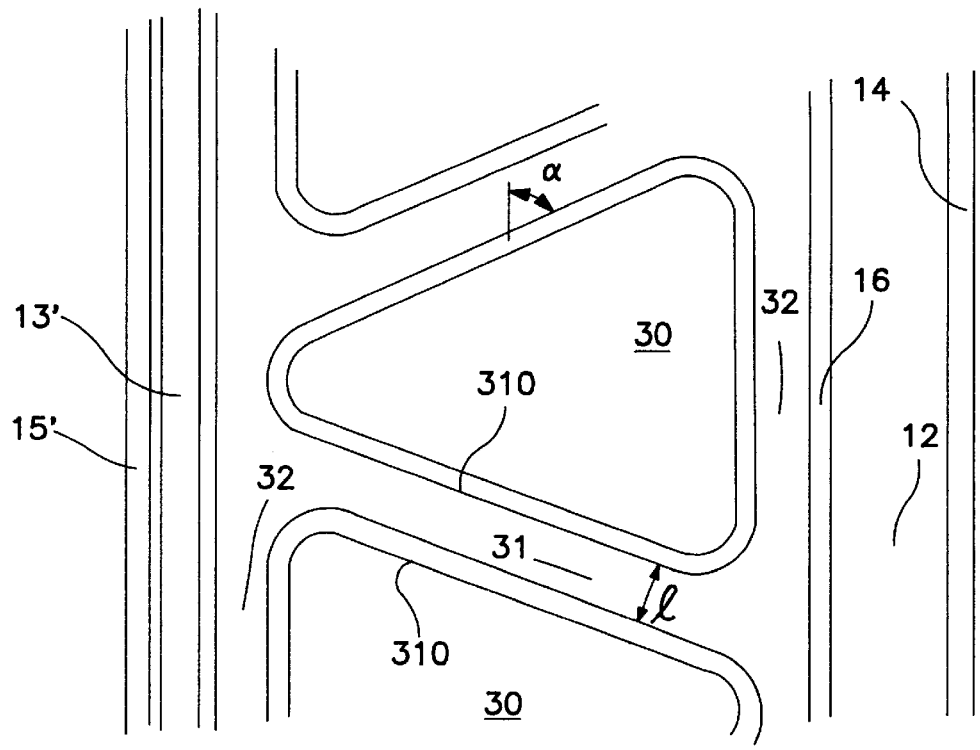
FIG. 3 is a top view of the rim of FIG. 2.
Figure 4:
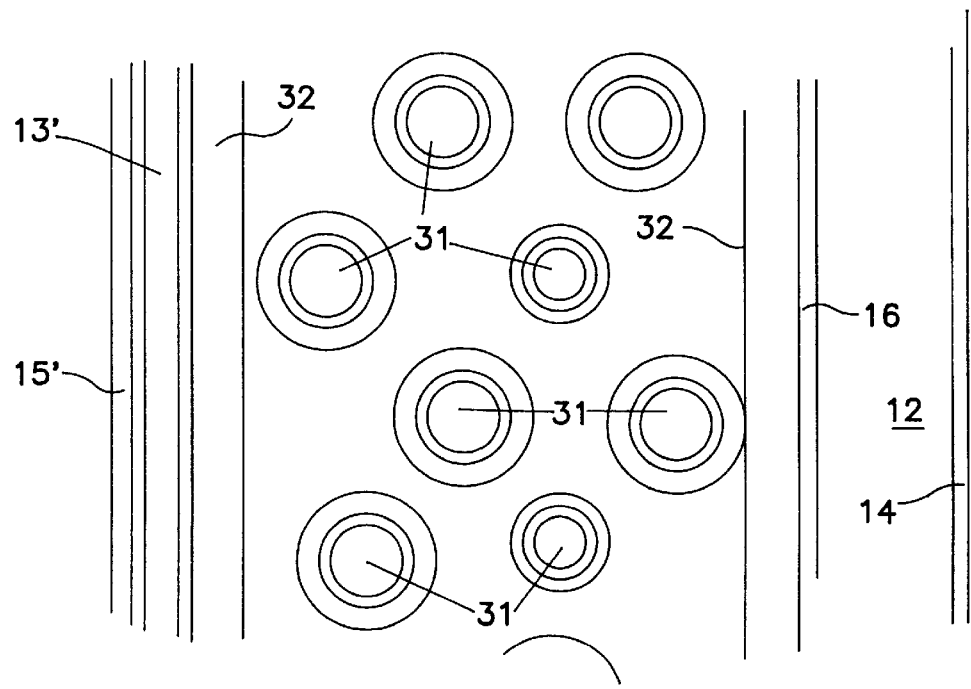
FIG. 4 is a variant, seen from above, of the rim in accordance with the invention.

The wheel rim shown in FIG. 4 differs from the rim of FIGS. 2 and 3 mainly by the fact that the transverse ribs are replaced by blocks 31 of aluminum or other rigid material in the form of conical frustums. In the example shown, the said conical frustums 31 are of the same volume, but they may be of different volumes, due to the fact that the surfaces of their bases may be of different dimensions, the only constraint to which the blocks 31 are subject residing in the fact that all the radially upper bases of said blocks are merged with the radially upper face of the bearing surface 11.

Figure 5:
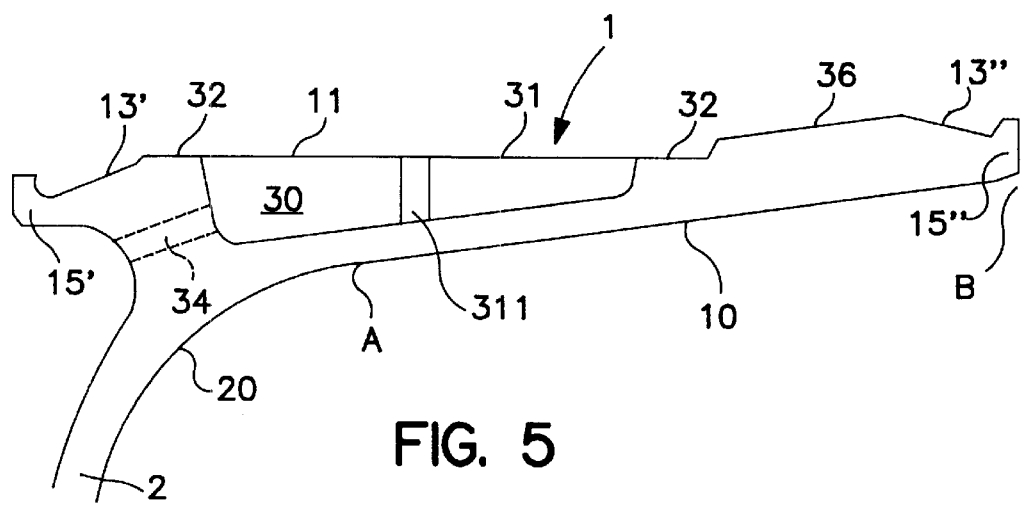
FIG. 5 is another variant wheel, seen in meridian section.

The wheel rim shown in FIG. 5 differs from the rim of FIG. 2 mainly by the fact that the second rim seat 13" has a diameter greater than the diameter of the first bearing surface 13', the diameter of a rim seat being by definition the diameter of the axially inner end of this generatrix, which makes it possible to eliminate the mounting groove 12 and replace it by a frustoconical connecting surface 36 between the second rim seat 13" and the bearing surface 1 1. The generatrix 10 of the radially inner wall of the rim 1 is thus imparted a uniform frustoconical meridian profile from the point of tangency A between said profile and the inner wall of the disk 2 to its end B, the diameter of the wall 10 increasing continuously in monotonic fashion from A to B. Each transverse rib 31 is provided at its center with a groove 311 which permits the flow of inflation gas between hollows.

Figure 6:
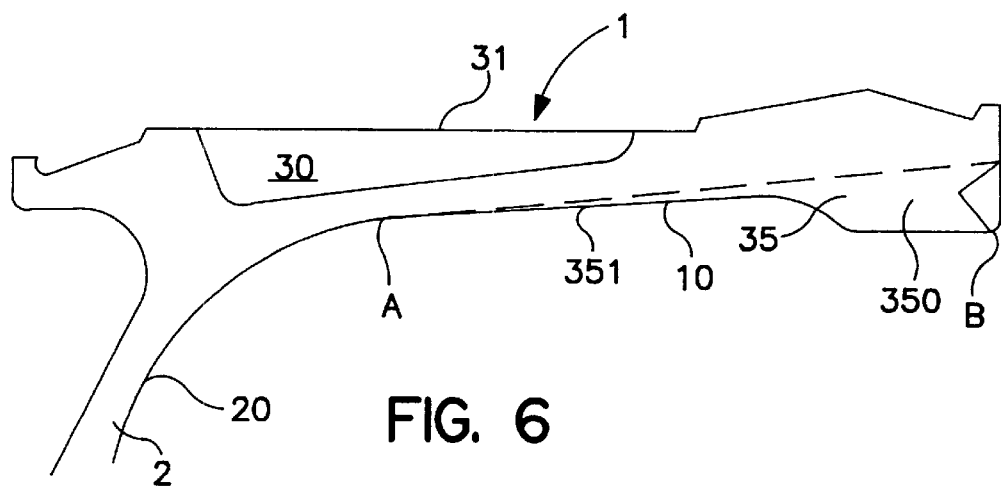
FIG. 6 shows, in meridian section, the wheel of FIG. 5, the radially inner face of which has four transverse ribs.

FIG. 6 shows, seen in meridian section, a variant wheel rim such as shown in FIG. 5, but having, on its radially inner face 10, four ribs 35 which are circumferentially equidistant from each other and have on their axially outside edges bulges 350, such that a radially inner generatrix 351 of a rib 35 has, on the edge of the rib, points spaced from the axis of rotation of the rolling assembly by an amount less than the distance separating said axis from the point A of tangency with the generatrix 20 of the axially and radially inner wall of the disk 2.

The wheel, shown in one of FIGS. 2 to 6, makes it possible furthermore, for the same size of tire, to increase the volume of inflation gas, which has the advantage of decreasing the speed with which the tire, mounted on such a wheel, loses its pressure by diffusion.

We claim:

1. A wheel comprising a rim having a first rim seat on one side of the rim and a second rim seat on the opposite side of the rim, each rim seat having an axially outer end and an axially inner end, at least the first rim seat having a generatrix the axially outer end of which is on a circle with a diameter less than the diameter of the circle on which the axially inner end is located, a hump of slight height extending said first rim seat axially to the outside, a bearing surface adapted to receive a tread support ring, said bearing surface axially extending the first rim seat, a radially inner wall defining a portion of the rim, and a wheel disk connected on the side of the first rim seat to the radially inner wall of the rim, said bearing surface being defined by the outer surfaces of a plurality of elements in relief projecting radially outwardly from the rim, and recesses separating the elements in relief.

2. A wheel according to claim 1, in which, on a major part of the entire surface of the radially inner wall of the rim, each point of a generatrix of said inner wall between a point of tangency A of said generatrix with a corresponding axially inner generatrix of the disk and an end B located axially on the outer end of the second rim seat is on a circle of a diameter $D_P$ at least equal to the diameter $D_A$ of the circle on which the point of tangency A is located and at most equal to the diameter $D_B$ of the circle on which the end B is located.

3. A wheel according to claim 2, in which the major part of the entire surface of the radially inner wall of the rim represents at least 70% of said surface, and up to all of said surface.

4. A wheel according to claim 1, made of material of low density selected from the group consisting of the metals aluminum and magnesium, all alloys derived from said metals, and thermoplastic and thermosetting materials.

5. A wheel according to claim 2, in which the wall of diameter $D_A$ increases in diameter continuously in the axial direction from the point of tangency A to the diameter on which the point B is located.

6. A wheel according to claim 1, in which the recessed ratio of the rim bearing surface, defined in terms of the ratio of the surface $S_E$ occupied by the recesses to the total surface $S_T$ of the radially outer face of the bearing surface, is between 0.4 and 0.9.

7. A wheel according to claim 1, in which the elements in relief include ribs which have circumferential components and attached ribs which have transverse components.

8. A wheel according to claim 7, which includes discontinuous transverse ribs separated by recesses.

9. A wheel according to claim 7, in which the transverse ribs have, on the radially outer face of the bearing surface, surfaces defined circumferentially by linear sides forming an angle α of at least 45° with the circumferential direction.

10. A wheel according to claim 1 in which the elements in relief include at least two circumferential ribs axially to the outside of the bearing surface and blocks of material constituting the wheel.

11. A wheel according to claim 1 in which the rim comprises a mounting groove located axially towards the second rim seat and a channel which connects a recess separating elements in relief with the mounting groove.

12. A wheel according to claim 11, in which the recess connected to the mounting groove by a channel is in communication with a source of air for inflating a tire mounted on the wheel.

13. A wheel according to claim 2, in which the second wheel rim seat has a generatrix the axially inner end of which is on a circle with a diameter equal to the diameter of the circle on which the axially inner end of the generatrix of the first rim seat is located and on a circle of a diameter greater than the diameter of the circle on which its axially outer end is located, and including a hump located axially to the outside of the second rim seat and a flange located axially to the inside of the second rim seat.

14. A wheel according to claim 2, in which the second rim seat has a generatrix the axially inner end of which is on a circle with a diameter greater than the diameter of the circle on which the axially inner end of the generatrix of the first rim seat is located and on a circle with a diameter greater than the diameter of the circle on which the axially outer end is located, and in which the generatrix of the radially inner wall of the rim has a frustoconical meridian profile from the point A the end B and including a hump located axially to the outside of the second rim seat and a frustoconical surface between the second rim seat and the bearing surface.

15. A wheel according to claim 2, comprising, on the radially inner face of the wheel, four ribs, circumferentially equidistant from each other, having bulges at the axially outer edges of the ribs, and in which a radially inner generatrix of a rib has, on the inner edge of the rib, points spaced from the axis of rotation of the rolling assembly by an amount less than the distance separating the point A from the axis of rotation of the wheel.

16. A wheel as set forth in claim 1, in which the elements in relief include conical frustums with circular bases.

* * * * *